Feb. 8, 1927.
T. H. KRUEGER
1,616,535
ENVELOPE AND THE LIKE AND CARRIER THEREOF
Filed Jan. 7, 1921    2 Sheets-Sheet 1
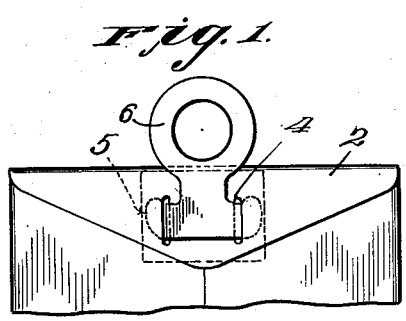
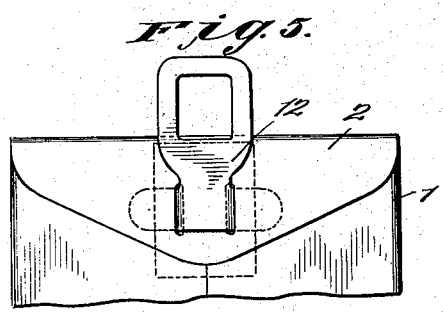
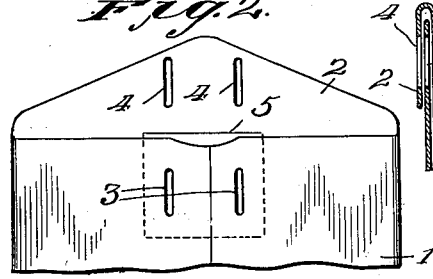
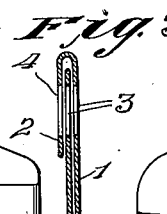
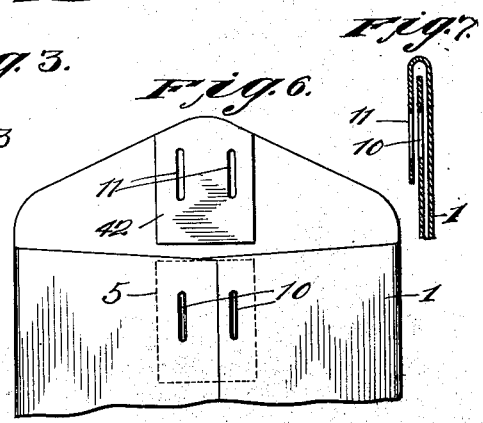
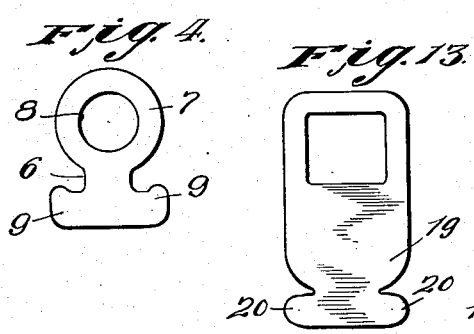
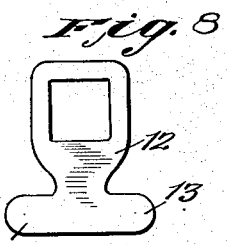
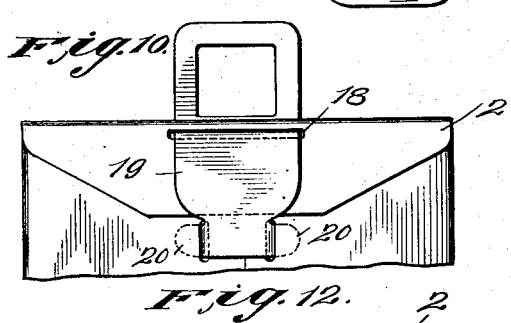
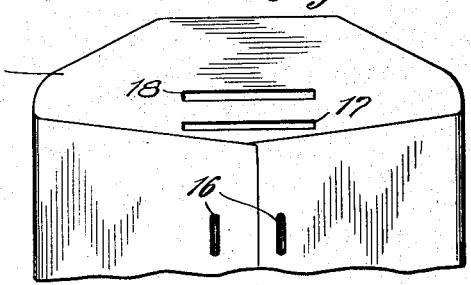
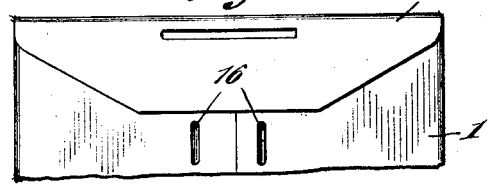
INVENTOR
Theodore H. Krueger
BY
Moses Hammond & Middleton
ATTORNEYS Feb. 8, 1927.
T. H. KRUEGER
1,616,535
ENVELOPE AND THE LIKE AND CARRIER THEREOF
Filed Jan. 7, 1921   2 Sheets-Sheet 2
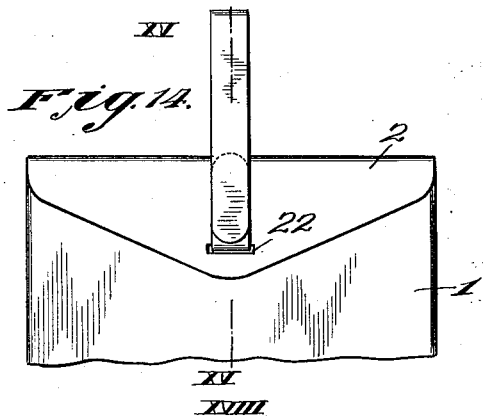
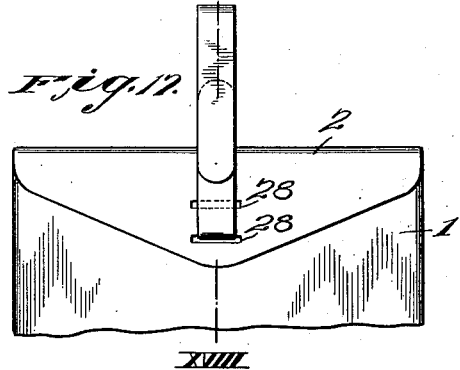
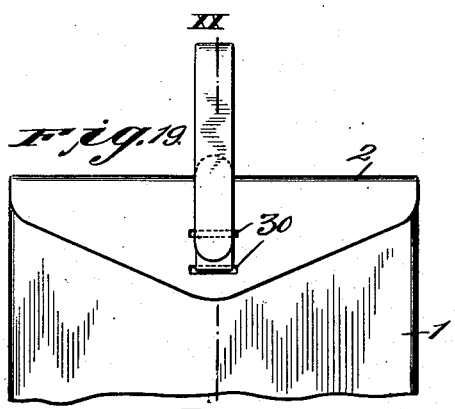
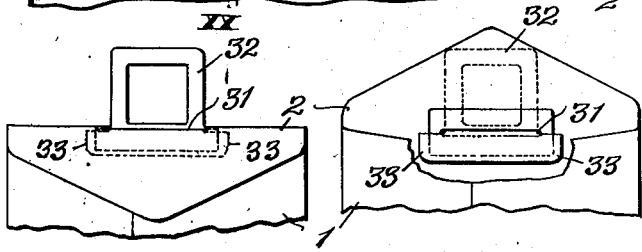
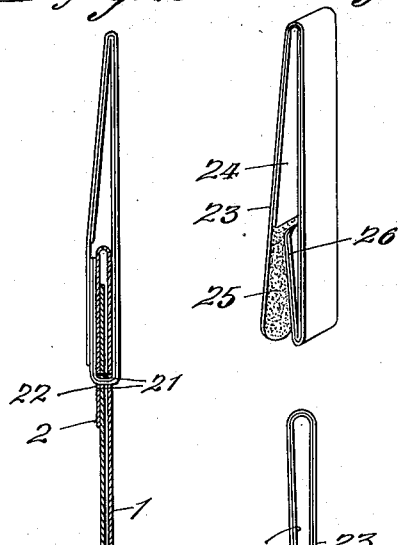
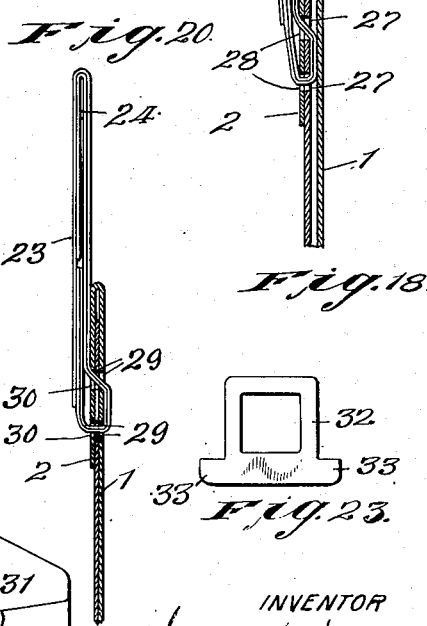
INVENTOR
Theodore H. Krueger
BY
Moses Hammond Middleton
ATTORNEYS Patented Feb. 8, 1927.

1,616,535

UNITED STATES PATENT OFFICE.

THEODORE H. KRUEGER, OF NEW YORK, N. Y.

ENVELOPE AND THE LIKE AND CARRIER THEREOF.

Application filed January 7, 1921. Serial No. 435,632.

This invention relates to improvements in envelopes and the like and carriers therefor and has for its object to provide envelopes and carriers adapted to be assembled in co-acting engagement with one another to permit of the envelope being carried in a convenient manner.

The invention further has for its object to provide envelopes and carriers which are so constructed that when they are assembled for the purpose of permitting the envelope to be carried, the envelope will be maintained closed.

Further objects of the invention are to provide envelopes and carriers which are simple in construction, economical to manufacture, efficient in use, and which may be quickly assembled.

In the accompanying drawings forming part of this specification, wherein I have shown several preferred embodiments of my invention for the purpose of illustrating the principle thereof, Figure 1 is an elevational view of a portion of an envelope and a carrier, the same being shown assembled;

Figure 2 is an elevational view of a portion of the envelope, the flap thereof being in its open position;

Figure 3 is a detail sectional view of a portion of the envelope with the flap closed;

Figure 4 is an elevational view of the carrier detached from the envelope;

Figures 5, 6, 7 and 8 are views similar to Figures 1, 2, 3 and 4, respectively, showing a modification of the invention;

Figure 9 is an elevated view of a member for holding the envelope closed;

Figure 10 is a view similar to Figures 1 and 5 showing a further modification;

Figure 11 is an elevational view of a portion of the envelope shown in Figure 10, the flap being open;

Figure 12 is a view similar to Figure 11, the flap being closed;

Figure 13 is an elevational view of the carrier shown in Figure 10;

Figure 14 is an elevational view of a portion of an envelope and a carrier illustrating a further modification, the parts being shown assembled;

Figure 15 is a sectional view taken on the line XV—XV of Figure 14, the carrier being shown in elevation;

Figure 16 is a perspective view of the carrier shown in Figures 14 and 15, before being affixed to the envelope;

Figures 17 and 18 and Figures 19 and 20 are views similar to Figures 14 and 15, respectively, showing further modifications;

Figure 21 is an elevational view of a portion of an envelope and a carrier illustrating a further modification, the parts being shown assembled;

Figure 22 is a view similar to Figure 20, the flap being open and a part of the wall of the envelope being broken away, and Figure 23 is an elevational view of the carrier shown in Figures 21 and 22.

Referring to Figures 1 to 4 of the drawings, there is shown a portion of an envelope comprising a body portion 1 and a flap 2, which envelope may be of any desired size and shape and may be formed in any suitable manner. The front and rear walls of the body portion are provided with a plurality of registering slots 3 with which similar slots 4, formed in the flap 2, are adapted to register when the flap is closed, as clearly shown in Figure 3. If desired, a reinforcing member 5, formed of paper or the like, may be applied to the inner surface of the rear wall, as shown in Figures 1 and 2. In order to permit the envelope to be carried in a convenient manner, a carrier 6 is provided which includes a handle portion 7, having an opening 8 formed therein adapted to receive one or more fingers of the hand, and portions 9 adapted to pass through and interlock with the registering slots 3, 4 in the envelope, as indicated in Figure 1, whereby the carrier is detachably secured to the envelope. When the carrier is thus secured to the envelope the flap will be maintained closed and the envelope may be carried by inserting one or more fingers of the hand through the opening 8 of the handle portion 7 which projects beyond the envelope. When it is desired to open the envelope it is merely necessary to remove the carrier by withdrawing the portions 9 thereof from the slots with which they are in interlocking engagement, whereupon the flap may be opened.

Referring to Figures 5, 6 and 7, the body portion 1 of the envelope has slots 10 formed in its rear wall only, with which slots 11 formed in the flap 2 are adapted to register when the flap is closed. The flap is shown as having a reinforcing member 42, formed of paper or the like, secured to its inner wall, as shown in Figure 6. A carrier 12, (see Fig. 8) similar to the carrier 6, is adapted to be detachably secured to the envelope by means of portions 13 which interlock with the registering slots 10, 11, as shown in Figure 5. The carrier is attached to, and detached from, the envelope, as explained above in connection with Figures 1 to 4. In order to permit the envelope to be sent through the mail by parcel post, if so desired, I provide a flap-closing member 14, see Fig. 9, the end portions of which are adapted to interlock with the registering slots 10, 11, to maintain the flap closed. In order to hold the member properly positioned with respect to the envelope, it is provided with a projection 15 intermediate the interlocking end portions thereof. As the member 14 may be quickly detached from the envelope, the latter may be opened by the postal authorities should it be desired to inspect the contents of the envelope.

Referring to Figures 10 to 13, the body portion 1 of the envelope is provided with slots 16 in its rear wall end, with a slot 17 on its front wall adjacent the edge thereof, the slots 16 being so positioned that they will be below the flap 2 when it is closed, as shown in Figure 12. The flap 2 has a slot 18 formed therein similar in size and shape with the slot 17 in the front wall of the envelope and adapted to register therewith when the flap is closed. With this envelope is used a carrier 19, see Fig. 13, having one of its ends shaped to form a handle portion and having portions 20 at its other end adapted to interlock with the slots 16 in the rear wall of the envelope. To attach the carrier 19 to the envelope, after the flap is closed, the portions 20 are interlocked with the slots 16 and the upper portion of the carrier is then passed through the registering slots 17, 18, as indicated in Figure 10, whereby the flap is held closed and the envelope may be carried by grasping the handle of the carrier which projects beyond the envelope.

In the modification shown in Figures 14 and 15, the front and rear walls of the body portion 1 of the envelope are each provided with a single slot 21, registering with one another, and the flap 2 is provided with a slot 22 adapted to register with the slots 21 when the flap is closed. To be used in connection with this envelope there is provided a carrier, shown in Figure 16, which is formed of outer and inner strips of paper or the like, 23, 24, such as gummed tape, for example, secured to one another, the inner strip being shorter than the outer strip to provide an end portion 25 of single thickness, the inner surface of which is coated with gum or other adhesive. The other end of the carrier, which is of double thickness, is folded upwardly, as indicated at 26, into registering relation with the gummed surface of the end portion 25. The carrier is secured to the envelope, after the flap is closed, by passing the upwardly bent end portion 26 thereof through the registering slots 21, 22, and then securing the end portions 25 and 26 to one another by means of the gum on the inner surface of the end portion 25, as indicated in Figure 15.

In Figures 17 and 18 there is shown an envelope having a plurality of slots 27 formed in the rear wall and arranged one above the other, and the flap 2 has similar slots 28 formed therein and adapted to register with the slots 27 in the envelope when the flap is closed. The carrier, 23, 24, which is similar to that shown in Figure 16, is secured to the envelope by threading it through the registering slots 27, 28, as indicated in Figure 18, and then securing the end portions to one another as explained above.

The modification shown in Figures 19 and 20 differs from that shown in Figures 17 and 18 only in that both walls of the body portion 1 are provided with a plurality of registering slots 29, with which similar slots 30 formed in the flap are adapted to register when the flap is closed. The carrier 23, 24 is constructed as hereinabove described and is secured to the envelope by threading it through the registering slots 29, 30 and then securing the ends together, as explained above in connection with Figures 17 and 18.

Referring to Figures 21 and 22, the envelope is shown as having a slot 31 formed therein at the junction of the flap 2 and the body portion 1 of the envelope. In connection with this envelope there is employed a carrier including a handle portion 32 and laterally extending projections 33 adjacent the lower end thereof. The width of the handle portion 32 of the carrier is substantially equal to the length of the slot 31 to permit it to be slipped through the slot before the flap is closed, as indicated in Figure 22, in which position of the carrier the projections 33 extend beyond the ends of the slot. After the carrier is thus positioned, the flap is closed, and the envelope may then be carried by means of the handle portion of the carrier by reason of the fact that the projections will be in interlocking engagement with the envelope as indicated in Figure 21.

It is, of course, understood that the size and shape of the carriers, and of the handle portions and envelope-interlocking portions thereof, may be varied without departing from the spirit of the invention, and that the shape and arrangement of the slots in the envelope may also be varied.

While for purposes of illustration I have shown the envelope as being provided with a flap, it is of course understood that, as regards certain features of the invention, I may employ an envelope which is in the form of a bag and which is not provided with a flap, and it is to be understood that both types of envelopes are intended to be covered by the word "envelope" as used in the claims which do not specifically include the flap as an element.

While I have illustrated and described my invention in connection with several preferred embodiments thereof, it will be understood that I do not intend to limit myself to the specific embodiments shown, but that I intend to cover my invention broadly in whatever form its principle may be employed.

Having thus described my invention, I claim:

1. The combination with an envelope having a closing flap and provided with registering slots in the body portion and the flap, of a combined carrying and locking device, said device consisting of a flat member of stiff sheet material, comprising a carrying portion and a portion adapted to be passed through said slots.

2. The combination with an envelope having a closure flap and provided with registering slots in the body portion and the flap, of a member formed of stiff sheet material, said member comprising a locking portion adapted to be extended through said slots to retain said flap in closed position and comprising a handle portion whereby said member may be caused to serve as a carrier for the envelope.

3. In combination, an envelope having a closure flap, reinforcing means for the body portion of the envelope and the flap, said body portion and flap being provided with slots registering with each other when said flap is closed, said slots being in the reinforced parts of the envelope, and a carrier member for the envelope of comparatively stiff sheet material detachable therefrom and having a carrying portion and a portion adapted to be inserted through said slots.

4. The combination with an envelope provided with a closure flap, the body portion and flap of the envelope being provided with slots adapted to register with each other when the flap is closed, said slots being substantially at right angles to the direction of the fold between the closure flap and body portion of the envelope, of a carrying and locking member of sheet material comprising a portion for serving as a handle, and a locking portion substantially parallel to said fold and adapted to be extended through said slots.

5. A combined carrying and locking device for envelopes consisting of a flat member of sheet material, said member being comprised of an upper portion shaped as a handle, and an integral lower portion comprising a plurality of tongues for being inserted through slots in the envelope, the material of said member being stiff so as to retain the flap of the envelope closed against the body portion when the tongues are inserted through said slots.

In testimony whereof I have affixed my signature to this specification.

THEODORE H. KRUEGER.